United States Patent [19]

Nukushina et al.

[11] Patent Number: 4,857,918
[45] Date of Patent: Aug. 15, 1989

[54] FAULT DIAGNOSTIC APPARATUS FOR ELECTRIC APPLIANCE

[75] Inventors: Harunobu Nukushina; Chiaki Sugimoto, both of Fuji, Japan

[73] Assignee: Kabushiki Kaisha Toshiba, Kawasaki, Japan

[21] Appl. No.: 18,713

[22] Filed: Feb. 25, 1987

[30] Foreign Application Priority Data

Feb. 25, 1986 [JP] Japan .................................. 61-39949
Mar. 24, 1986 [JP] Japan .................................. 61-64149

[51] Int. Cl.⁴ ............................................. G08C 19/16
[52] U.S. Cl. .............................. 340/870.01; 340/505; 340/517; 340/825.16; 340/825.54
[58] Field of Search ...................... 340/870.01, 825.54, 340/825.06, 825.07, 825.15, 825.16, 506, 505, 504, 503, 517, 519, 520, 521, 522

[56] References Cited

U.S. PATENT DOCUMENTS

| | | | |
|---|---|---|---|
| 4,048,620 | 9/1977 | Crandell | 340/825.54 |
| 4,381,549 | 4/1983 | Stamp, Jr. et al. | |
| 4,498,075 | 2/1985 | Gaudio | 340/505 |
| 4,718,622 | 1/1988 | Rahman | 340/505 |

FOREIGN PATENT DOCUMENTS

| | | | |
|---|---|---|---|
| 0935896 | 10/1973 | Canada | 340/825.54 |
| 0143976 | 10/1984 | European Pat. Off. | 340/825.15 |
| 2127194 | 4/1984 | United Kingdom | 340/517 |

Primary Examiner—Donald J. Yusko
Assistant Examiner—Tyrone Queen
Attorney, Agent, or Firm—Cushman, Darby & Cushman

[57] ABSTRACT

A fault diagnostic apparatus for a device subject to a plurality of predetermined fault conditions. The apparatus includes a fault detector for automatically detecting the occurrence of any of the plurality of fault conditions and an indicating circuit for indicating the occurence of only specific one of the plurality of fault conditions manually designated by an operator.

12 Claims, 15 Drawing Sheets

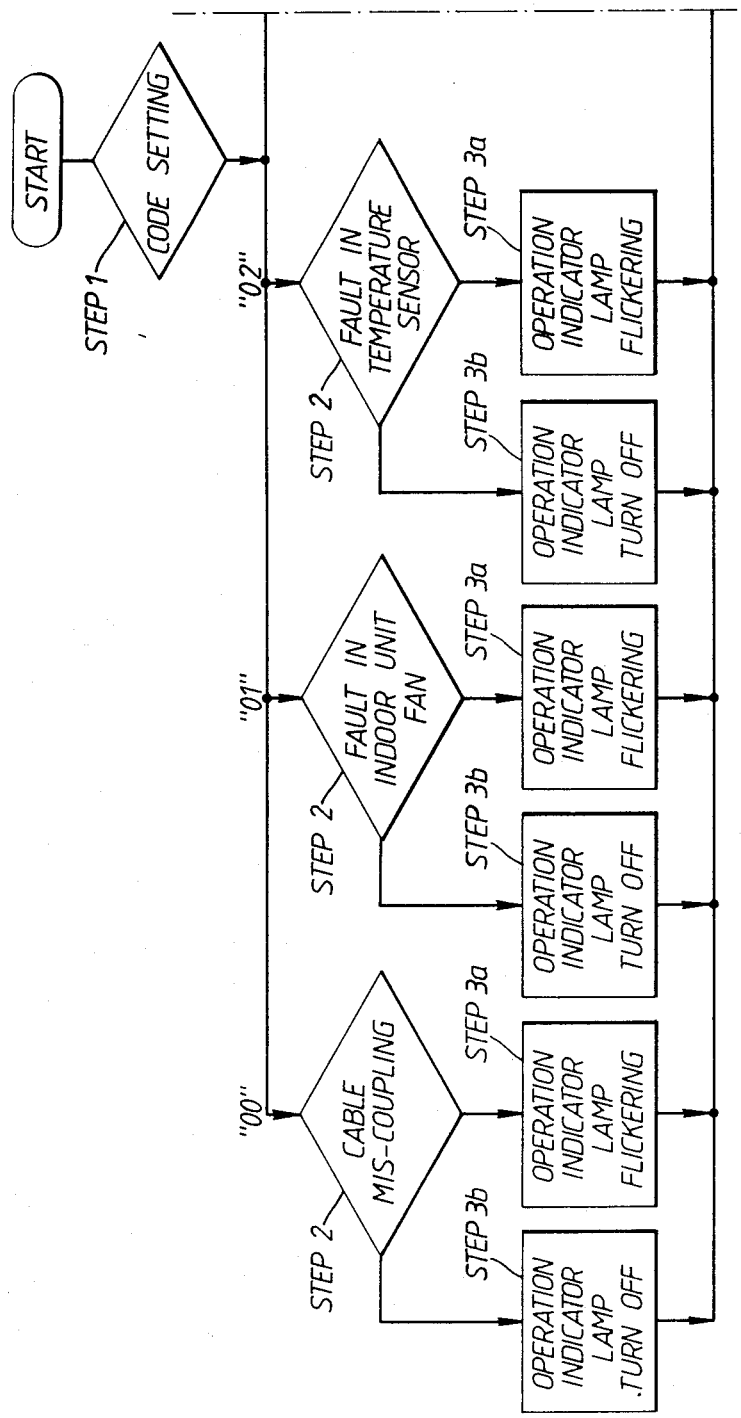

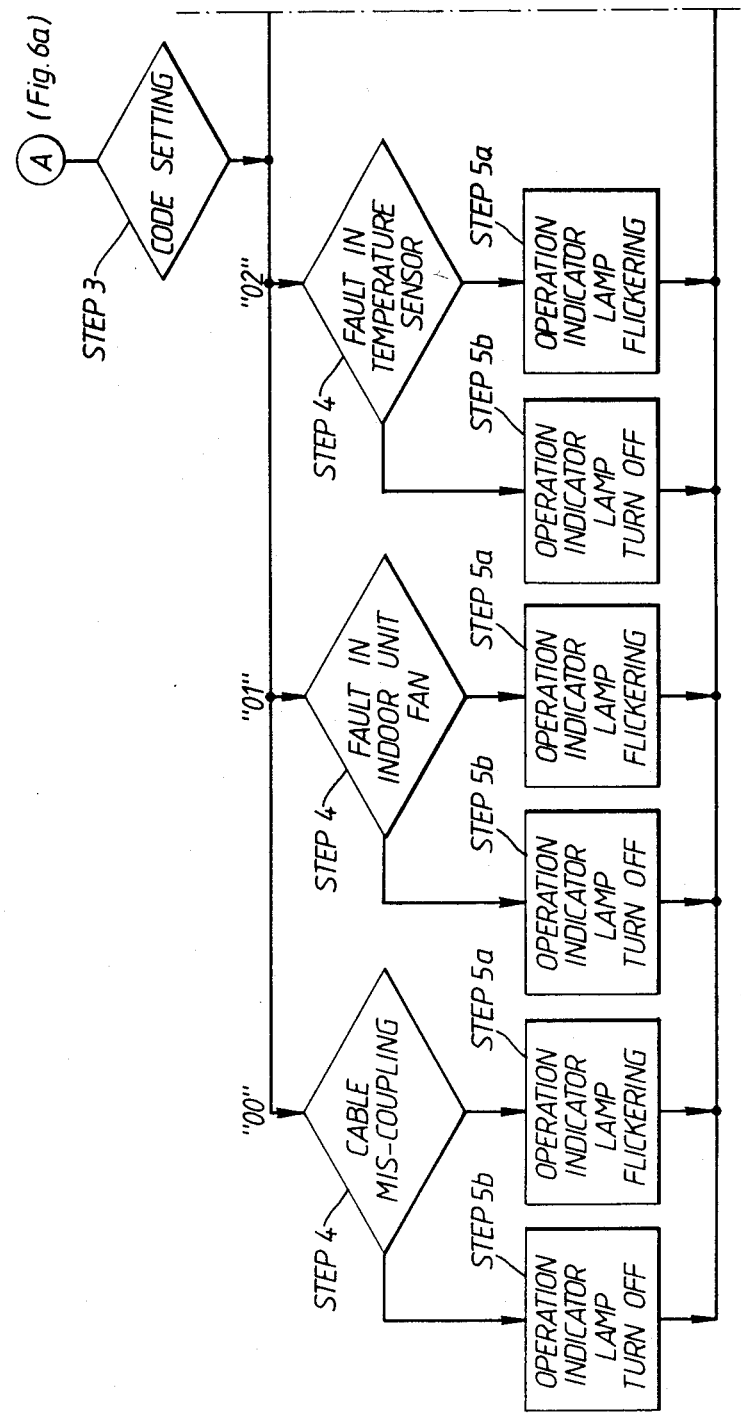
Fig. 6b(1).

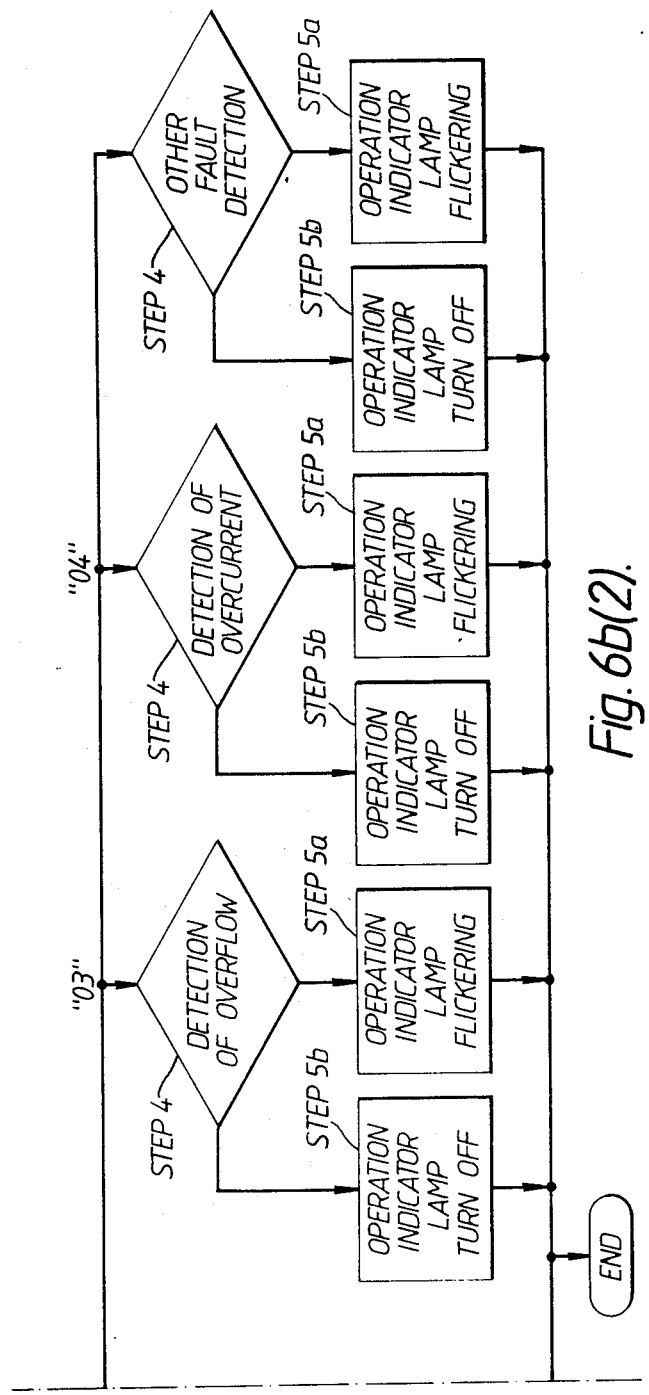
Fig. 6b(2).

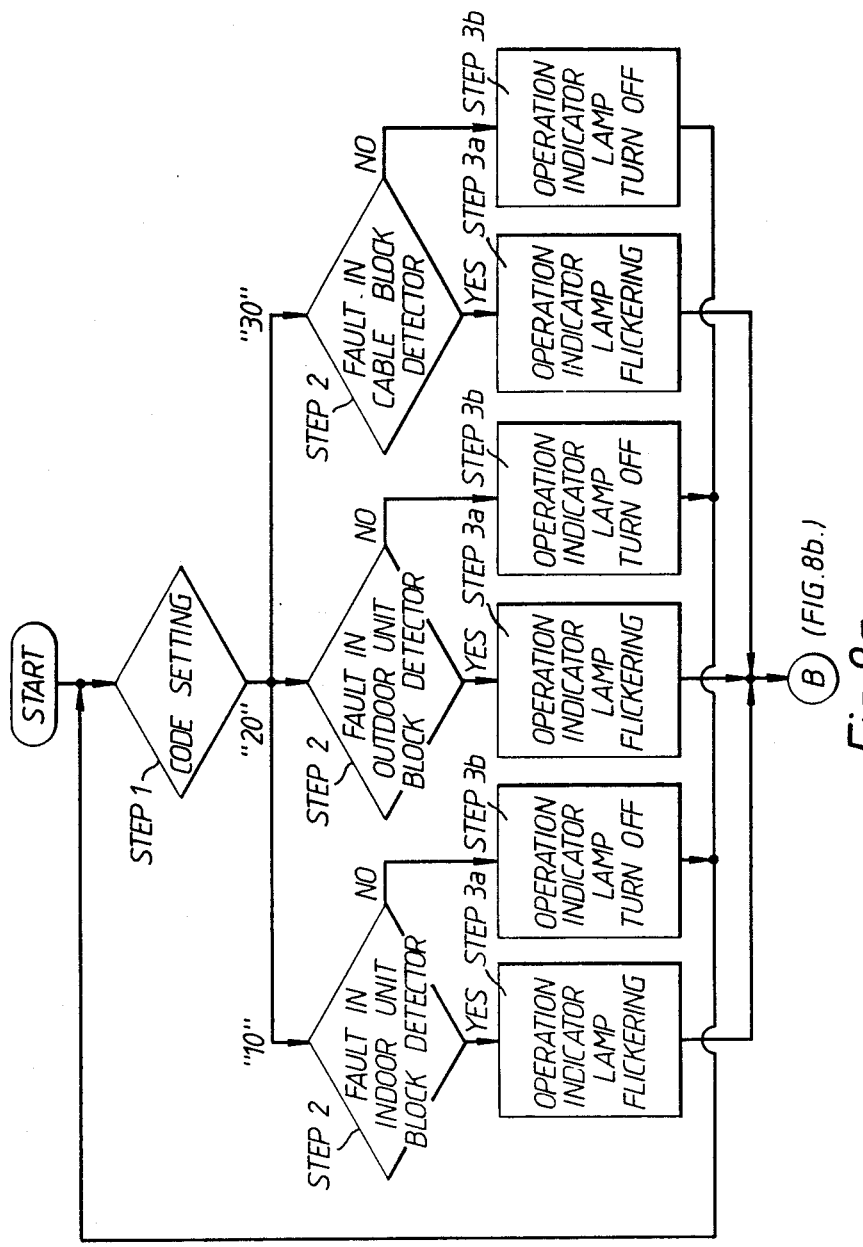

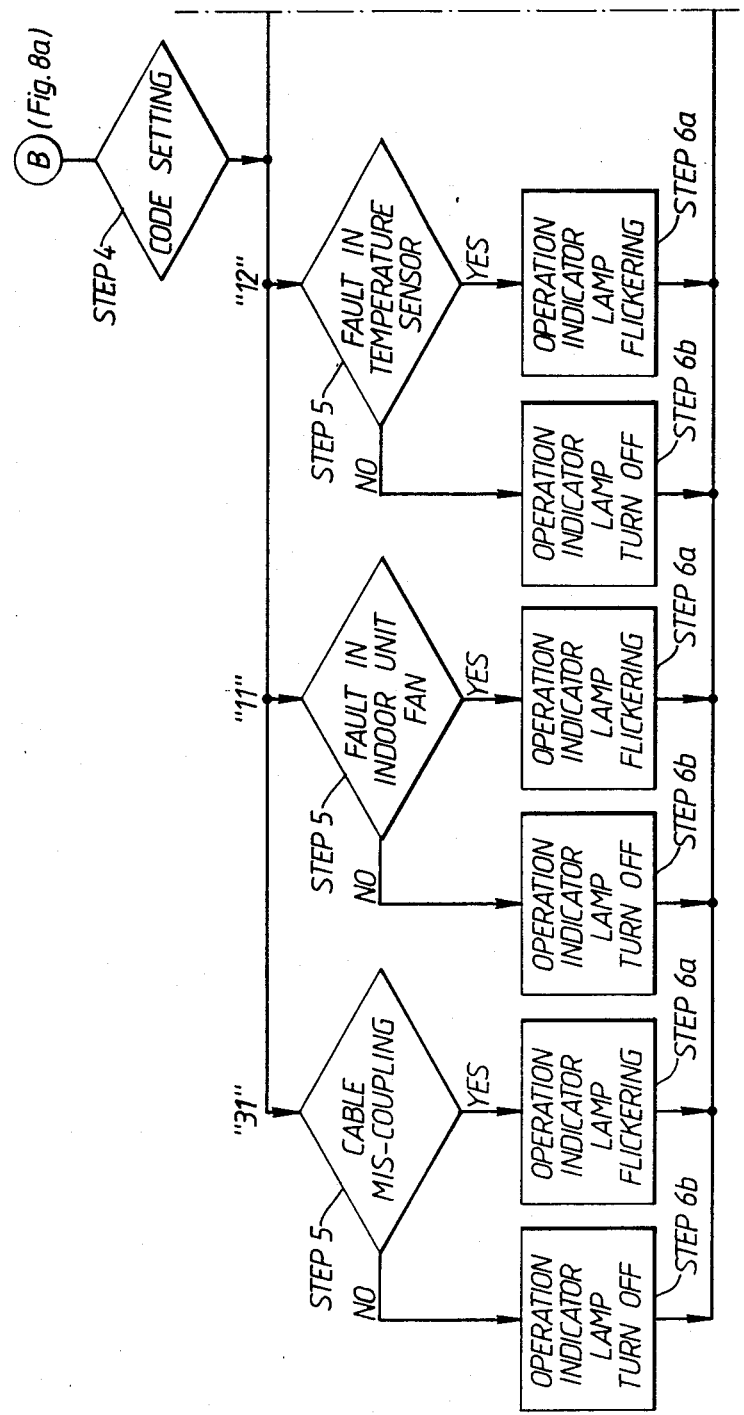
Fig. 8b(1).

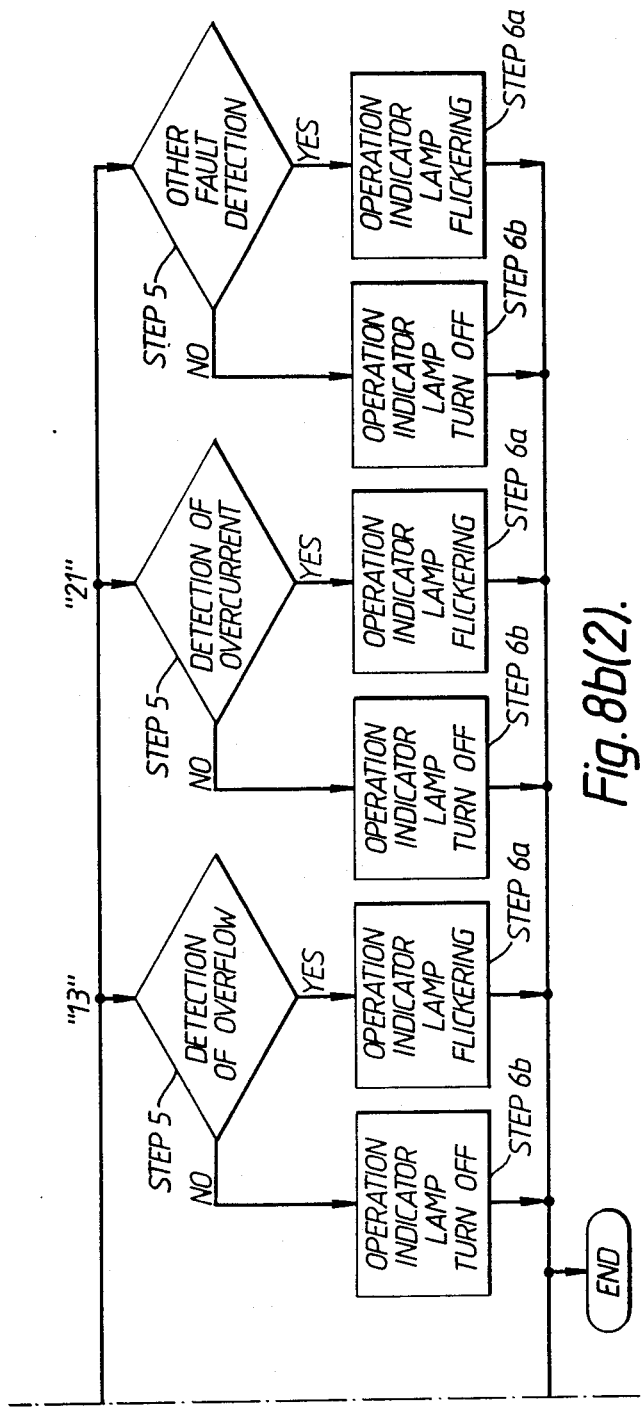

FAULT DIAGNOSTIC APPARATUS FOR ELECTRIC APPLIANCE

BACKGROUND OF THE INVENTION

1. Field of the Invention

This invention relates to a fault diagnostic apparatus and, more particularly, to a fault diagnostic apparatus for an electric appliance such as an air conditioning system.

2. Description of the Prior Art

A presently known heat pump type air conditioning system has the ability to determine when the air conditioning system is operating improperly and has provisions for indicating to the owner of the system when service is required and also for indicating to the serviceman the general nature of the fault or faults involved in the improper operation.

Such a fault diagnostic apparatus for a serviceman is disclosed, for example, in U.S. Pat. No. 4,381,549. The fault diagnostic apparatus of this patent can indicate a plurality of fault items in a fixed specified order in a fault diagnostic operation mode. The fault items are displayed by code numbers corresponding to each possible fault item on a light emitting diode (LED) matrix display for visual readout of information data. The fault diagnostic apparatus of the patent, however, has a drawback in that a plurality of LEDs is required for the LED matrix display. The fault diagnostic apparatus of this patent also has another drawback in that the serviceman cannot immediately inquire about specific fault item, or examine the fault items in any desired order. Further, the fault diagnostic apparatus of this patent has an important drawback in that the serviceman easily may misread the code number because many numbers are displayed for short intervals.

SUMMARY OF THE INVENTION

Accordingly, an object of the present invention is to provide a fault diagnostic apparatus for an air conditioning system which has an indicator with a more simple construction.

Another object of the present invention is to provide a fault diagnostic apparatus for an air conditioning system in which the serviceman can immediately examine for the occurence of a specific fault item.

A further object of the present invention is to provide a fault diagnostic apparatus for an air conditioning system in which the serviceman can examine a plurality of fault items in any desired order.

In order to achieve the above objects, the fault diagnostic apparatus for air conditioning system according to the present invention includes a fault detector for automatically detecting the occurence of any of the plurality of fault conditions and an indicating circuit for indicating, in response to an inquiry about a specific potential fault condition. Manually designated by the operator, whether that fault condition exists.

BRIEF DESCRIPTION OF THE DRAWINGS

FIGS. 3a and 3b show an operation flow chart for the fault diagnostic routine of the first embodiment shown in FIG. 2;

FIGS. 6a, 6b(1) and 6b(2) show operation flow chart for the fault diagnostic routine of the second embodiment shown in FIGS. 5a and 5b;

FIGS. 8a, 8b(1) and 8b(2) show an operation flow chart for the fault diagnostic routine of the third embodiment shown in FIG. 7.

DESCRIPTION OF THE PREFERRED EMBODIMENTS

Figure 1:
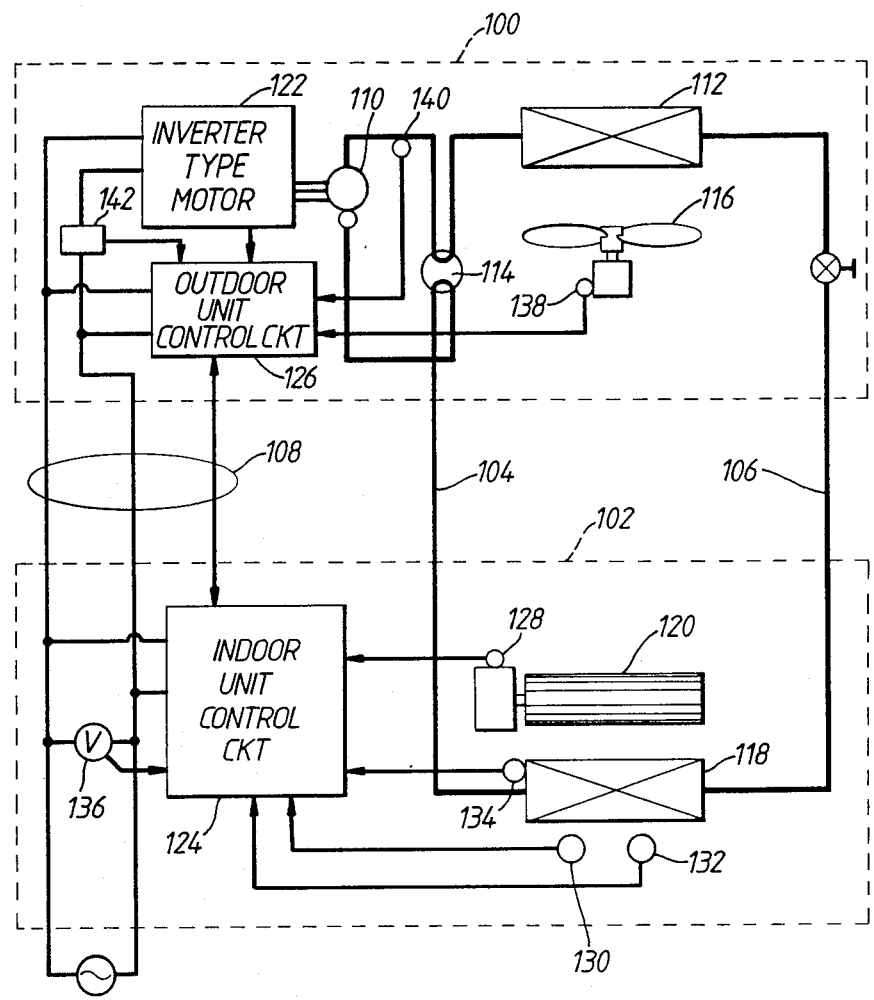
FIG. 1 is a block diagram of a typical air conditioning system.

The present invention will be described in detail with reference to the accompanying drawings, namely, FIGS. 1 to 9. Throughout the drawings, like reference numerals and letters are used to designate like or equivalent elements for the sake of simplicity of explanation.

Referring now to FIG. 1, a typical air conditioning system will be briefly described. The air conditioning system of FIG. 1 comprises an outdoor unit 100, an indoor unit 102, a pair of refrigerant pipes 104 and 106 and a cable 108 for signal and power transmissions between the indoor unit 102 and the outdoor unit 100. The outdoor unit 100 includes a compressor 110, an outdoor unit heat exchanger 112, a fluid change over switch 114 and an outdoor unit fan 116. The indoor unit 102 includes an indoor unit heat exchanger 118 and an indoor unit fan 120. The indoor unit heat exchanger 118 is coupled to the compressor 110 and the outdoor unit heat exchanger 112 of the outdoor unit 100 through the pair of refrigerant pipes 104 and 106 so that a refrigerant circulates through the compressor 110, the outdoor unit heat exchanger 112 and the indoor unit heat exchanger 118. The fluid change-over switch 114 changes directions of the refrigerant compressed by the compressor 110 to the outdoor unit heat exchanger 112 or the indoor unit heat exchanger 118 in accordance with a cooling operation or a heating operation. In the heating operation, the compressed refrigerant flows into the indoor unit heat exchanger 118 of the indoor unit 102 through the fluid change-over switch 114 and condenses therein. The condensed refrigerant is transmitted into the outdoor unit heat exchanger 112 of the outdoor unit 100 and evaporates therein. In the cooling operation, the compressed refrigerant flows into the outdoor unit heat exchanger 112 of the outdoor unit 100 through the fluid change-over switch 114 and condenses therein. The condensed refrigerant is transmitted into the indoor unit heat exchanger 118 of the indoor unit 102 and evaporates therein. The evaporated refrigerant returns into the compressor 110 and is compressed therein. The compressor 110 is driven by an inverter type motor 122 while the outdoor unit fan 116 and the indoor unit fan 120 promote the evaporation or the condensation of the refrigerant in the indoor unit heat exchanger 118 and outdoor unit heat exchanger 112.

The operation of the air conditioning system is controlled by a remote controller, as described later. The controller wirelessly transmits command data to an indoor unit control circuit 124 in the indoor unit 102. The indoor unit control circuit 124 directly controls the indoor unit fan 120 in response to the command data and also transmits the command data to an outdoor unit control circuit 126 in the outdoor unit 100. The outdoor unit control circuit 126 controls the outdoor unit fan 116 and the inverter type motor 122 in response to the command data.

The indoor unit control circuit 124 and the outdoor unit control circuit 126 are connected to a plurality of detectors for detecting faults or sensors for receiving control signals therefrom. The indoor unit control circuit 124, for example, is connected to an indoor unit fan fault detector 128 for the indoor unit fan 120, an atmospheric temperature sensor 130 for an indoor environment, a humidity sensor 132 for the indoor environment, a heat exchanger temperature sensor 134 for the indoor unit heat exchanger 118 and a voltage sensor 136 for a power supply source. The outdoor unit control circuit 126, for example, is connected to an outdoor unit fan fault detector 138 for the outdoor unit fan 116, a temperature sensor 140 for the compressed refrigerant and a current sensor 142 for the power supply source. One of the control circuit, e.g., the indoor unit control circuit 124 has a function to detect a miscoupling of the cable 108 to the outdoor unit 100 or indoor unit 102. The indoor unit control circuit 124 or the outdoor unit control circuit 126 discriminates the miscoupling of the cable 108 by examining whether the indoor unit control circuit 124 or the outdoor unit control circuit 126 fails to transmit a predetermined signal.

Figure 2:
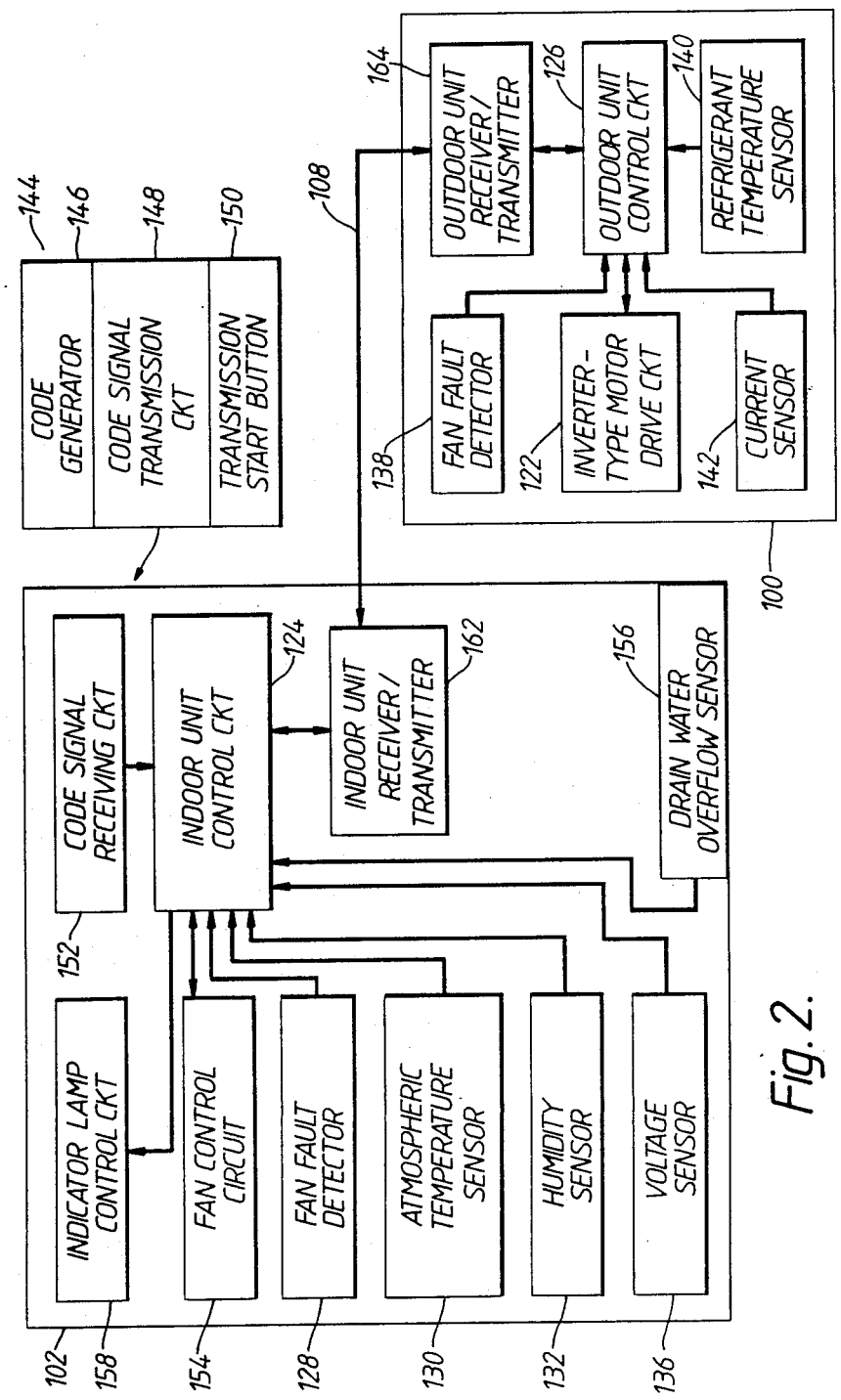
FIG. 2 shows a circuit block diagram of a first embodiment of the fault diagnostic apparatus for the air conditioning system according to the present invention.

Referring now to FIG. 2, a first embodiment of the fault diagnostic apparatus for the air conditioning system will be described. The first embodiment of the fault diagnostic apparatus comprises the indoor unit control circuit 124, the outdoor unit control circuit 126 and the wireless remote controller now designated with a reference 144.

The wireless remote controller 144 is the primary manual input device that interfaces with the user and includes various desired input keys, and associated logic circuits for manual entry of user-selected control data to the air conditioning system. The wireless remote controller 144 includes a code generator 146 for generating identification codes specified to fault items and converting them to corresponding code signals, a code signal transmission circuit 148 for wirelessly transmitting the identification code signals and a transmission start button 150 for the code signal transmission circuit 148. The identification codes are previously stored in memories, e.g., ROMs (read only memory) provided in the code generator 146. The code generator 146 is activated by a fault diagnostic mode switch (not shown) which is located, for example, at a hidden part of an enclosure of the wireless remote controller 144 and is intended to be accessed by the serviceman. The code generator 146 reads out a suitable identification code in accordance with operations of the input keys and converts it to the corresponding code signal. The identification code signal is wirelessly transmitted from the code signal transmission circuit 148 when the transmission start button 150 is operated by the serviceman. The code generator 146 and the code signal transmission circuit 148 may constitute a microprocessor. Table I below shows examples of fault items and corresponding identification codes stored in the ROMs of the code generator 146.

TABLE I

| Identification code | Fault Item |
|---|---|
| 00 | Miscoupling of Cable |
| 01 | Fault in Indoor Unit Fan |
| 02 | Abnormal State of Atmospheric Temperature |
| 03 | Overflow of Drain Water |
| 04 | Overcurrent in Power Supply System |

The above explanation will be applied to remote controllers of other embodiments as described later.

The indoor unit 102 has a code signal receiving circuit 152, the indoor unit control circuit 124, an indoor unit fan control circuit 154, the indoor unit fan fault detector 128, the atmospheric temperature sensor 130, the humidity sensor 132, a drain water overflow sensor 156, the voltage sensor 136, an indicator lamp control circuit 158, an indicator lamp 160, which is used with a lamp such as an operating state indicator lamp, and an indoor unit receiver/transmitter circuit 162. The code signal receiving circuit 152 receives the identification code signal transmitted from the wireless remote controller 144. The indoor unit control circuit 124 examines a signal obtained in a suitable detector or sensor in the indoor unit 102 in response to the corresponding identification code signal applied from the code signal receiving circuit 152. The indoor unit control circuit 124 also transmits identification code signal to the outdoor unit 100 through the cable 108. The indoor unit control circuit 124 drives the indicator lamp control circuit 158 when the selected detector on the outdoor unit 102 detects a fault.

The outdoor unit 100 includes an outdoor unit receiver/transmitter circuit 164, the outdoor unit control circuit 126, an outdoor unit fan control circuit 166, the outdoor fan fault detector 138, an inverter type motor drive circuit 168, the current sensor 142 and the refrigerant temperature sensor 140. The outdoor unit receiver/transmitter circuit 164 receives the identification code signal transmitted from the indoor unit receiver/transmitter circuit 162 in the indoor unit 102. The outdoor unit control circuit 126 examines a signal obtained in a suitable detector or sensor in the outdoor unit 100 in response to the corresponding identification code signal applied from the outdoor unit receiver/transmitter circuit 164. The outdoor unit control circuit 126 also drives the indicator lamp control circuit 158 of the indoor unit 102 through the indoor unit control circuit 124 in response to when the selected detector detects a fault.

The indoor unit control circuit 124 and/or the outdoor unit control circuit 126 further have the function to examine the miscoupling condition of the cable 108 by itself, as described above.

Figure 3B:
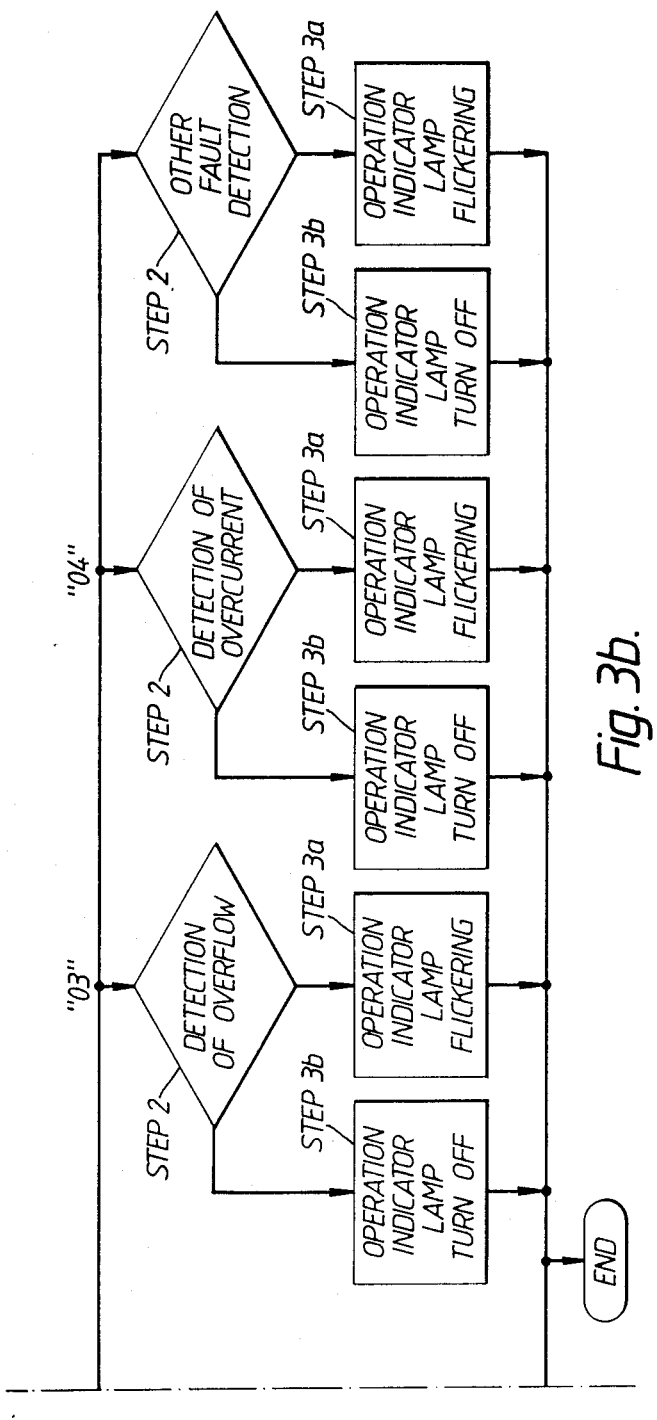

Referring now to FIG. 3, an operation flow chart is shown for the fault diagnostic routine of the first embodiment of the present invention. In the flow chart, diamond shaped boxes represent program inquiries, while rectangular shaped boxes represent program instructions. This is the same as operation flow charts of other embodiments described later.

The routine starts when the serviceman operates the fault diagnostic mode switch of the wireless remote controller 144. The code generator 146 then reads out any one of the identification codes stored in the memories in STEP 1. However, the identification code is easily able to be replaced by a desired one by operating a suitable key, e.g., an UP key or a DOWN key of the input keys. A code signal corresponding to the desired identification code is transmitted to the indoor unit control circuit 124 of the indoor unit 102. The routine forwards to a suitable flow branch in response to the identification code, in STEP 2. The code signals corresponding to the identification codes "00", "01" and "02" are processed in the indoor unit control circuit 124 of the indoor unit 102, while the code signals corresponding to the identification codes "03", "04" and others are processed in the outdoor unit control circuit 126 of the outdoor unit 100.

Figure 4:
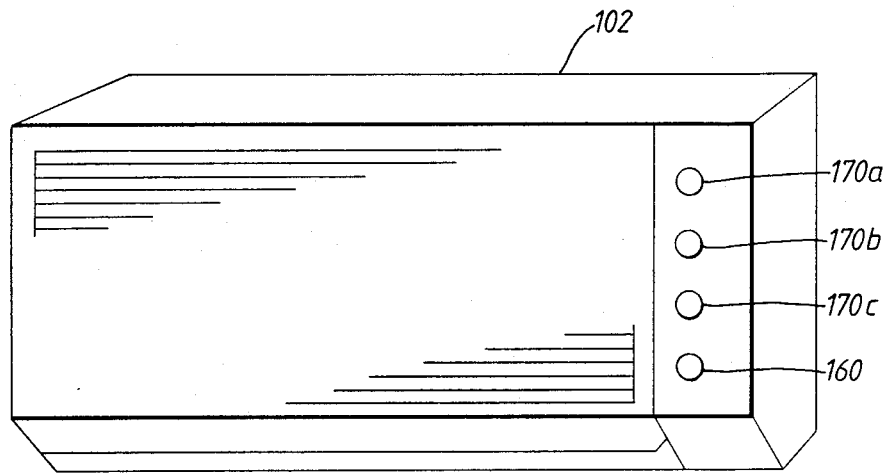
FIG. 4 is a perspective view of a practical construction of the indoor unit shown in FIG. 2.

When the identification code "00" is designated in the code generator 146 of the wireless remote controller 144, the indoor unit control circuit 124 examines whether signals transmitted through the cable 108 agree with expected signals or not, in STEP 2 of a "00"-branch. Thus, the miscoupling condition of the cable 108 to the outdoor unit 100 and indoor unit 102 is examined. In accordance with the detection of the cable miscoupling condition, the indoor unit control circuit 124 drives the indicator lamp control circuit 158 so that the indicator lamp 160 connected to the indicator lamp control circuit 158 flickers, in STEP 3a of the "00"-branch. When the indoor unit control circuit 124 does not detect a miscoupling condition of the cable 108, the indicator lamp 160 goes out, in STEP 3b of the "00"-branch. The indicator lamp 160 is able to be provided only for indicating the result of the fault diagnostic, or the indicator lamp 160 also may be used as a lamp for indicating the operating state of the air conditioning system. The operating state indicator lamp 160 is mounted on a front panel of the indoor unit 102, as shown in FIG. 4. When the identification code "01" is designated in the code generator 146 of the wireless remote controller 144, the indoor unit control circuit 124 performs an inspection for a detection signal from the indoor unit fan fault detector 128, in STEP 2 of a "01"-branch. When the indoor unit fan fault detector 128 detects some fault of the indoor unit fan 120, the indoor unit control circuit 124 drives the indicator lamp control circuit 158 so that the indicator lamp 160 flickers, in STEP 3a of the "01"-branch. When the indoor unit fan fault detector 128 does not detect any fault of the indoor unit fan 120, the indoor unit control circuit 124 drives the indicator lamp control circuit 158 so that the indicator lamp 160 goes out, in STEP 3b of the "01"-branch. When the identification code "02" is designated in the code generator 146 of the wireless remote controller 144, the indoor unit control circuit 124 performs an inspection on a detection signal from the atmospheric temperature sensor 130, in STEP 2 of a "02"-branch. When the detection signal of the atmospheric temperature sensor 130 is out of a predetermined level range, the indoor unit control circuit 124 drives the indicator lamp control circuit 158 so that the indicator lamp 160 flickers, in STEP 3a of the "02"-branch. When the detection signal of the atmospheric temperature sensor 130 is in the predetermined level range, the indoor unit control circuit 124 drives the indicator lamp control circuit 158 so that the indicator lamp 160 goes out, in STEP 3b of the "02"-branch. When the identification code "03" is designated in the code generator 146 of the wireless remote controller 144, the indoor unit control circuit 124 performs an inspection on a detection signal from the drain water overflow sensor 156, in STEP 2 of a "03"-branch. When the drain water overflow sensor 156 detects an overflow of drain water in the indoor unit 102, the indoor unit control circuit 124 drives the indicator lamp control circuit 158 so that the indicator lamp 160 flickers, in STEP 3a of the "03"-branch. When the drain water overflow sensor 156 does not detect an overflow of drain water, the indoor unit control circuit 124 drives the indicator lamp control circuit 158 so that the indicator lamp 160 goes out, in STEP 3b of the "03"-branch.

When the identification code "04" is designated in the code generator 146 of the wireless remote controller 144, the indoor unit control circuit 124 or the outdoor unit control circuit 126 performs an inspection for a detection signal from the current sensor 142, in STEP 2 of a "04"-branch. When the detection signal of the current sensor 142 is out of a predetermined amount range, the indoor unit control circuit 124 drives the indicator lamp control circuit 158 so that the indicator lamp 160 flickers, in STEP 3a of the "04"-branch. When the detection signal of the current sensor 142 is in the predetermined amount range, the indoor unit control circuit 124 drives the indicator lamp control circuit 158 so that the indicator lamp 160 goes out, in STEP 3b of the "04"-branch.

The same or equivalent routines are also performed for inspections on detected signals of the humidity sensor 132, the voltage sensor 136 and the refrigerant temperature sensor 140.

The first embodiment of the fault diagnostic apparatus is able to be modified as follows. In the modification, some identification codes are designated for a plurality of fault items, e.g., two fault items, as shown in Table II in below.

TABLE II

| Identification code | Fault Item for Lamp 170a | Fault Item for Lamp 170b |
| --- | --- | --- |
| 00 | Miscoupling of Cable | Overflow of Drain Water |
| 01 | Fault in Indoor Unit Fan | Overcurrent in Power Supply System |
| 02 | Abnormal State of Atmospheric Temperature | |

In the modification according to the Table II, the indoor unit control circuit 124 simultaneously or continuously performs two inspection routines in response to the designation of one identification code to the code generator 146 of the wireless remote controller 144. When one routine detects a fault, the indoor unit control circuit 124 drives the indicator lamp control circuit 158 so that one operation mode indicator lamp 170a, e.g., a heating mode indicator lamp connected to the indicator lamp control circuit 158 flickers. When the other routine detects a fault, the indoor unit control circuit 124 drives the indicator lamp control circuit 158 so that another operation mode indicator lamp 170b, e.g., a cooling mode indicator lamp connected to the indicator lamp control circuit 158 flickers. Therefore, the serviceman is easily able to discriminate between the fault items. The heating mode indicator lamp 170a and the cooling mode indicator lamp 170b also are mounted on a front panel of the indoor unit indoor unit 102, as shown in FIG. 4.

Figure 5A:
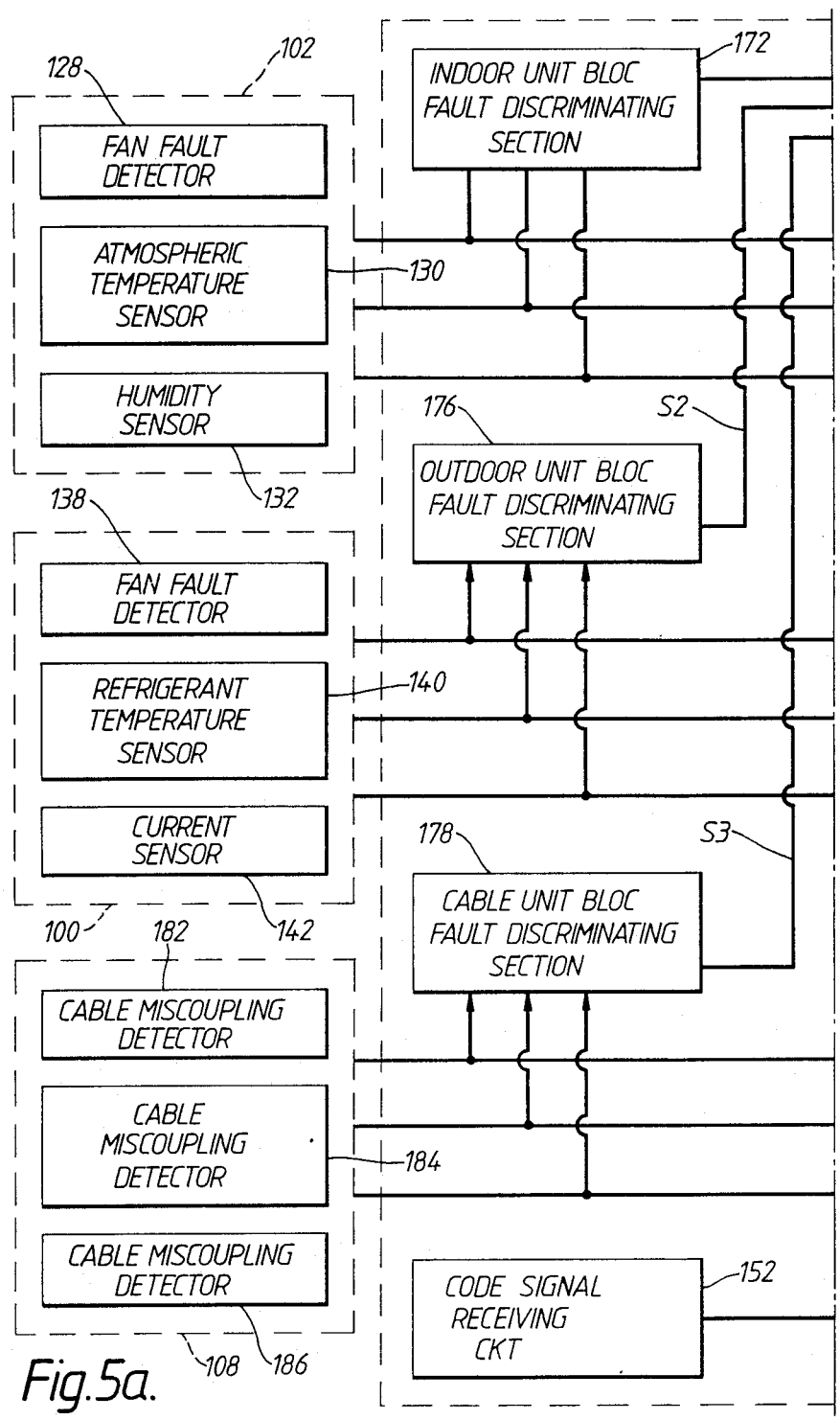
FIGS. 5a and 5b are a circuit block diagram of a second embodiment of the fault diagnostic apparatus for the air conditioning system according to the present invention.
Figure 5B:
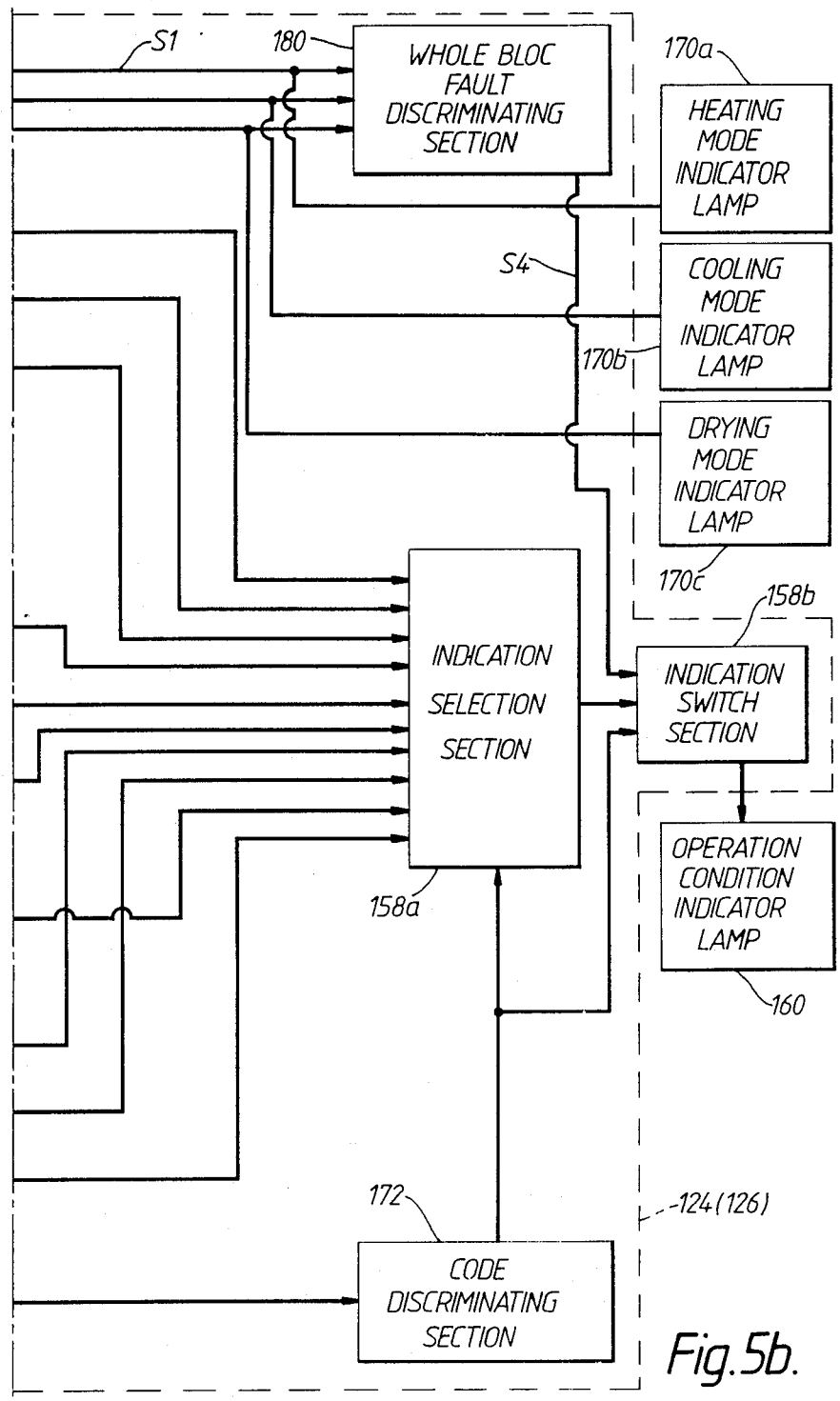

Referring now to FIG. 5, a second embodiment of the fault diagnostic apparatus for the air conditioning system will be described. The second embodiment of the fault diagnostic apparatus comprises the indoor unit control circuit 124 and the wireless remote controller 144. The wireless remote controller 144 has a construction the same or similar to the controller in the first embodiment. Therefore, the identification code signal is transmitted from the code signal transmission circuit 148 when the transmission start button 150 is operated by the serviceman.

The indoor unit control circuit 124 includes a code signal receiving circuit 152, a code discriminating section 172, an indoor unit bloc fault discriminating section 174, an outdoor unit bloc fault discriminating section 176, a cable bloc fault discriminating section 178, a whole bloc fault discriminating section 180, an indication selecting section indicator lamp control circuit 158a and an indication switching section indicator lamp control circuit 158b. The indoor unit bloc fault discriminating section 174 receives detection signals outputted from the indoor unit fan fault detector 128, the atmospheric temperature sensor 130, the humidity sensor 132, etc. in the indoor unit 102. The outdoor unit bloc fault discriminating section 176 receives detection signals outputted from the outdoor unit fan fault detector 138, the current sensor 142 and the refrigerant temperature sensor 140 in the outdoor unit 100. The detection signals of the outdoor unit fan fault detector 138, the current sensor 142 and the refrigerant temperature sensor 140 in the outdoor unit 100 are transmitted from the outdoor unit 100 to the indoor unit 102 through a cable 108 (see FIG. 1). The cable bloc fault discriminating section 178 receives detection signals outputted from cable miscoupling detectors 182, 184 and 186. The cable miscoupling detectors 182, 184 and 186 can be formed by a software system in the indoor unit control circuit 124 in which the software system performs a function to detect miscoupling conditions of signal wirings or power supply wirings in the cable 108 to the outdoor unit 100 or the indoor unit 102. That is, the indoor unit control circuit 124 detects the miscoupling conditions of the signal wirings or the power supply wirings in the cable 108 by examining whether the indoor unit control circuit 124 fails to transmit a predetermined signal between the outdoor unit 100 and the indoor unit 102. All of the detection signals are further applied to the indication selecting section indicator lamp control circuit 158a.

The indoor unit bloc fault discriminating section 174 supplies a first unit bloc fault discrimination signal S1 to a first indicator lamp. The first indicator lamp also can be used with the heating mode indicator lamp 170a (see FIG. 4). The outdoor unit bloc fault discriminating section 176 supplies a second unit bloc fault discrimination signal S2 to a second indicator lamp, when any one of the indoor unit fan fault detector 128, the atmospheric temperature sensor 130, the humidity sensor 132, etc. detects a fault condition corresponding to the detector or the sensor. The second indicator lamp also can be used with the cooling mode indicator lamp 170b (see FIG. 4). The cable bloc fault discriminating section 178 supplies a third unit bloc fault discrimination signal S3 to a third indicator lamp, when any one of the cable miscoupling detectors 182, 184 and 186 detects a fault condition corresponding to the specified detector 51, 52 or 53. The third indicator lamp can be used with a drying mode indicator lamp 170c. The drying mode indicator lamp 170c is mounted on the front panel of the indoor unit indoor unit 102 together with the heating mode indicator lamp 170a and the cooling mode indicator lamp 170b (see FIG. 4).

The unit bloc fault discrimination signals S1, S2 and S3 are further applied to a whole bloc fault discriminating section 180. The whole bloc fault discriminating section 180 supplies a whole bloc fault discrimination signal S4 to the indicator lamp control circuit 158b, when any one of the indoor unit bloc fault discriminating section 174, the outdoor unit bloc fault discriminating section 176 and the cable bloc fault discriminating section 178 outputs the unit bloc fault discrimination signal S1, S2 or S3. The indicator lamp control circuit 158b further receives output signals of the indicator lamp control circuit 158a and the code discriminating section 172. An output signal of the indicator lamp control circuit 158b is applied to a fourth indicator lamp 160. The fourth indicator lamp 160 can be used with an operating state indicator lamp 160, as described before in the first embodiment.

Figure 6A:
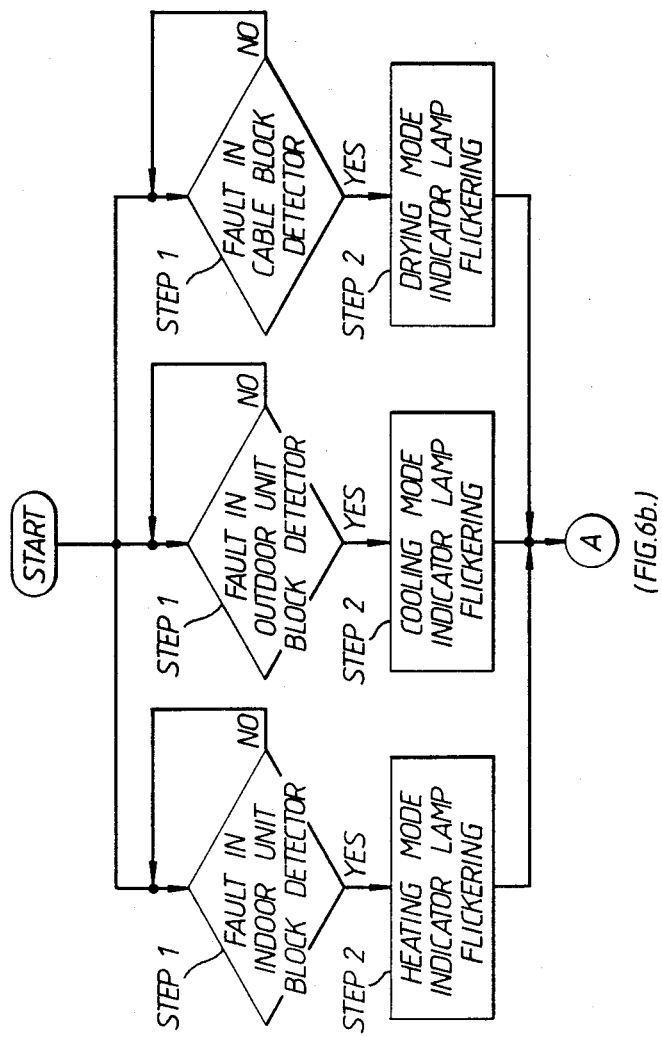

Referring now to FIG. 6, an operation flow chart is shown for the fault diagnostic routine of the indoor unit control circuit 124 of the second embodiment according to the present invention.

In the routine, the indoor unit bloc fault discriminating section 174, the outdoor unit bloc fault discriminating section 176 or the cable bloc fault discriminating section 178 discriminates whether any fault detection signal is outputted from the detectors or signals outputted from the sensors are out of a predetermined range, in STEP 1. The indoor unit bloc fault discriminating section 174 outputs a first bloc fault discrimination signal S1 and supplies the first bloc fault discrimination signal S1 to the heating mode indicator lamp 170a, in STEP 2. Similarly, the outdoor unit bloc fault discriminating section 176 outputs a second bloc fault discrimination signal S2 and applies the second bloc fault discrimination signal S2 to the cooling mode indicator lamp 170b. Also, the cable bloc fault discriminating section 178 outputs a third bloc fault discrimination signal S3 and applies the third bloc fault discrimination signal S3 to the drying mode indicator lamp 170c. The bloc fault discrimination signals S1, S2 and S3 are further applied to the whole bloc fault discriminating section 180. The whole bloc fault discriminating section 180 then outputs a whole bloc fault discrimination signal S4 and applies the whole bloc fault discrimination signal S4 to the indicator lamp control circuit 158b. The indicator lamp control circuit 158b drives the operation state indicator lamp 160 so that the operation state indicator lamp 160 flickers.

Therefore, the user of the air conditioning system can know that any fault has happened in the system from the flickering of the operation state indicator lamp 160 or the flickerings of the operation state indicator lamp 160 and any lamp of the heating mode indicator lamp 170a, the cooling mode indicator lamp 170b and the drying mode indicator lamp 170c, and can make a phone call to the serviceman for services. In the phone call, the serviceman can obtain from the user information about which lamp or lamps of the heating mode indicator lamp 170a, the cooling mode indicator lamp 170b and the drying mode indicator lamp 170c are flickering. The heating mode indicator lamp 170a, the cooling mode indicator lamp 170b and the drying mode indicator lamp 170c typically have letter indications, e.g., of "HEATING", "COOLING" and "DRYING", respectively. The serviceman can determine what bloc or unit has a fault according to the information of the letter indications through the phone call. Thus, the serviceman can bring service parts necessary for the unit.

A service or a diagnostic routine for the air conditioning system starts when the serviceman operates the fault diagnostic mode switch of the wireless remote controller 144 (see FIG. 2). At the start of the routine, the serviceman can immediately input identification codes corresponding to the fault items of the faulted unit, in response to the flickering lamp of the heating mode indicator lamp 170a, the cooling mode indicator lamp 170b and the drying mode indicator lamp 170c, in STEP 3 of FIG. 6. That is, the serviceman can neglect inspections for other blocs or units to which corresponding indicator lamps fail to indicate fault conditions. The code generator 146 then reads out any one of the identification codes stored in the memories in STEP 3. However, the identification code is easily able to be replaced by a desired one of the identification codes corresponding to the fault items of the faulted unit by operating a suitable key, e.g., an UP key or a DOWN key of the input keys. An identification code "00" is designated when the drying mode indicator lamp 170c has flickered in STEP 2. Identification codes "01", "02" and "03" are designated when the heating mode indicator lamp 170a has flickered in STEP 2. Identification codes "04" and others are designated when the heating mode indicator lamp 170b has flickered in STEP 2.

A code signal corresponding to the desired identification code is transmitted to the code signal receiving circuit 152 of the indoor unit control circuit 124. The routine forwards to a suitable flow branch in response to the identification code, in STEP 4. The code signals corresponding to the identification codes "00", "01", "03" and "03" are directly processed in the indoor unit control circuit 124 of the indoor unit 102, while the code signals corresponding to the identification codes "04" and others are transmitted from the outdoor unit 100 through the outdoor unit control circuit 126 and the cable 108 (see FIG. 2) and processed in the indoor unit control circuit 124. When the identification code "00" is designated in the code generator 146 of the wireless remote controller 144 for the inspection of any miscoupling of the cable 108, the indoor unit control circuit 124 examines whether signals transmitted through the cable 108 agree with expected signals or not, in STEP 4 of a "00"-branch. Thus, the miscoupling condition of the cable 108 to the outdoor unit 100 and indoor unit 102 is examined. In accordance with the detection of the cable miscoupling condition, the indication selection section 158a and the indication switching section 158b in the indoor unit control circuit 124 drive the indicator lamp 160 connected to the indication switching section 158b so that the indicator lamp 160 flickers, in STEP 5a of the "00" branch. When the indoor unit control circuit 124 fails to detect the miscoupling condition of the cable 108, the indicator lamp 160 goes out, in STEP 5b of the "00" branch. The indicator lamp 160 is able to be provided only for indicating the result of the fault diagnostic, or the indicator lamp 160 also may be used as a lamp for indicating the operating state of the air conditioning system. The operating state indicator lamp 160 is mounted on a front panel of the indoor unit 102, as shown in FIG. 4.

When any one of the identification codes "01" and etc. is designated in the code generator 146 of the wireless remote controller 144, the indoor unit control circuit 124 performs an inspection for the indoor unit 102. For example, when the identification code "01" is designated, the indoor unit control circuit 124 performs an inspection for the indoor unit fan fault detector 128, in STEP 4 of a "01"-branch. When the indoor unit fan fault detector 128 detects some fault of the indoor unit fan 120, the indoor unit control circuit 124 drives the indicator lamp control circuit 158 so that the indicator lamp 160 flickers, in STEP 5a of the "01"-branch. While the indoor unit fan fault detector 128 fails to detect any fault of the indoor unit fan 120, the indication selection section 158a and the indication switching section 158b in the indoor unit control circuit 124 drive the indicator lamp 160 so that the indicator lamp 160 goes out, in STEP 5b of the "01"-branch. The same or equivalent routines can be also performed for the inspection of the detected signals of the atmospheric temperature sensor 130, the humidity sensor 132, the voltage sensor 136 and the drain water overflow sensor 156.

When any one of the identification codes "04" and others is designated in the code generator 146 of the wireless remote controller 144, the indoor unit control circuit 124 performs an inspection for the outdoor unit 100. For example, when the identification code "04" is designated, the indoor unit control circuit 124 performs an inspection for the current sensor 142, in STEP 4 of a "04"-branch. When the detection signal of the current sensor 142 is out of a predetermined amount range, the indication selection section 158a and the indication switching section 158b in the indoor unit control circuit 124 drive the indicator lamp 160 so that the indicator lamp 160 goes out, in STEP 5b of the "04"-branch. The same or equivalent routines can be also performed for the inspection of the detected signals of the outdoor unit fan fault detector 138 and the refrigerant temperature sensor 140.

In operations of the the above diagnostic routines, the code signal receiving circuit 152 of the indoor unit control circuit 124 receives the identification code signal transmitted from the wireless remote controller 144. The code discriminating section 172 discriminates the identification code from the code signal and provides the code to the indicator lamp control circuit 158a. The code signal further is applied to the indicator lamp control circuit 158b so that the indicator lamp control circuit 158b is changed to the fault diagnostic operation mode. In the fault diagnostic operation mode, the indicator lamp control circuit 158b first turns off the operation state indicator lamp 160. The indicator lamp control circuit 158a selects a suitable fault detector or sensor in response to the corresponding identification code. The indoor unit control circuit 124 itself examines a signal obtained in the suitable detector or sensor. The indoor unit control circuit 124 drives the indicator lamp control circuit 158a in response to whether the selected detector or sensor detects a fault. For example, when an identification code for inspecting the indoor unit fan 120 (see FIG. 1) is inputted and the indoor unit fan fault detector 128 detects a fault, the indicator lamp control circuit 158a drives the operation state indicator lamp 160 so that the operation state indicator lamp 160 again flickers, in STEP 5a. Accordingly, the serviceman easily can determine the faulted section, i.e., the indoor unit fan 120, according to the prescribed inputted identification code corresponding to the indoor unit fan 120.

Figure 7A:
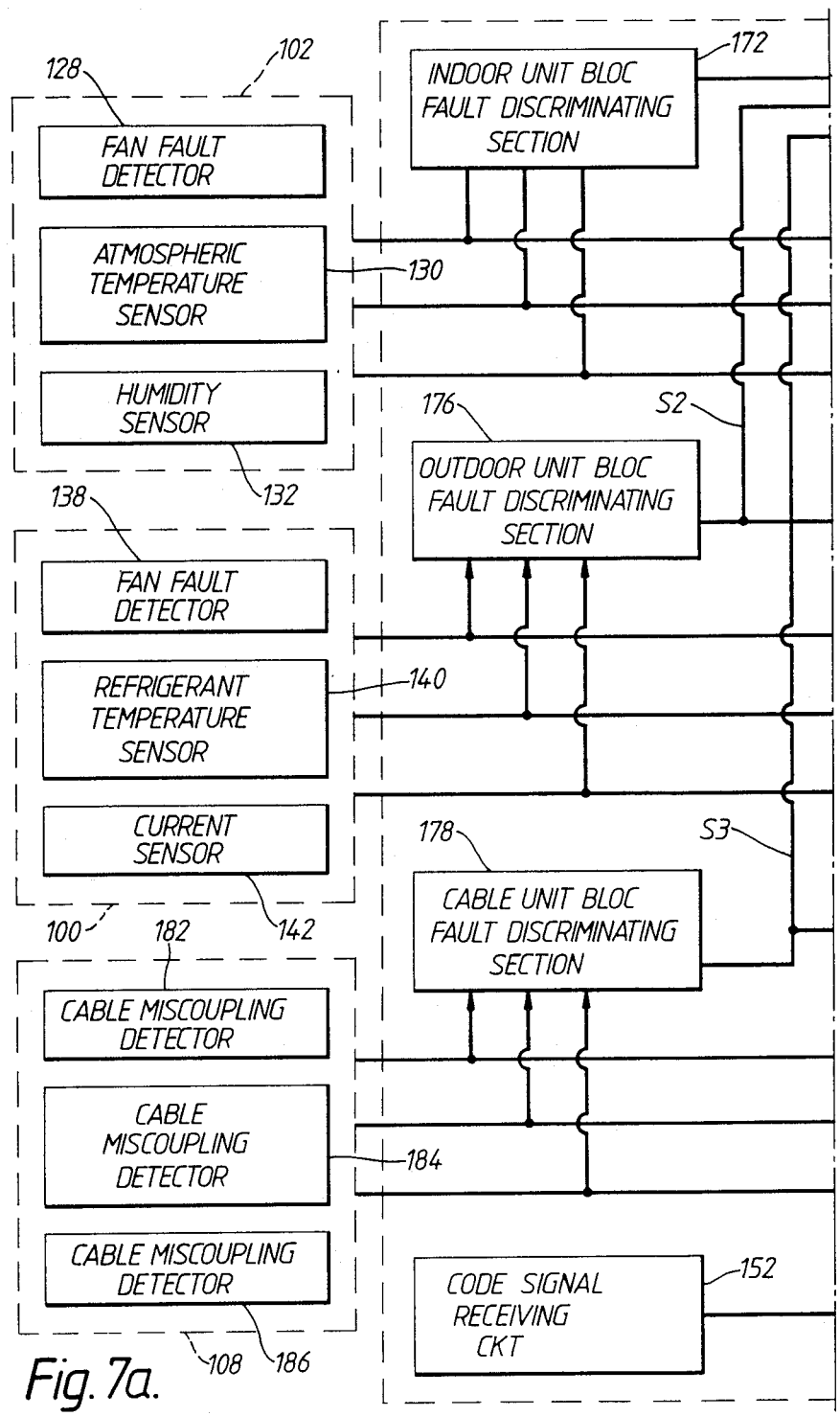
FIGS. 7a and 7b are a circuit block diagram of a third embodiment of the fault diagnostic apparatus for the air conditioning system according to the present invention.
Figure 7B:
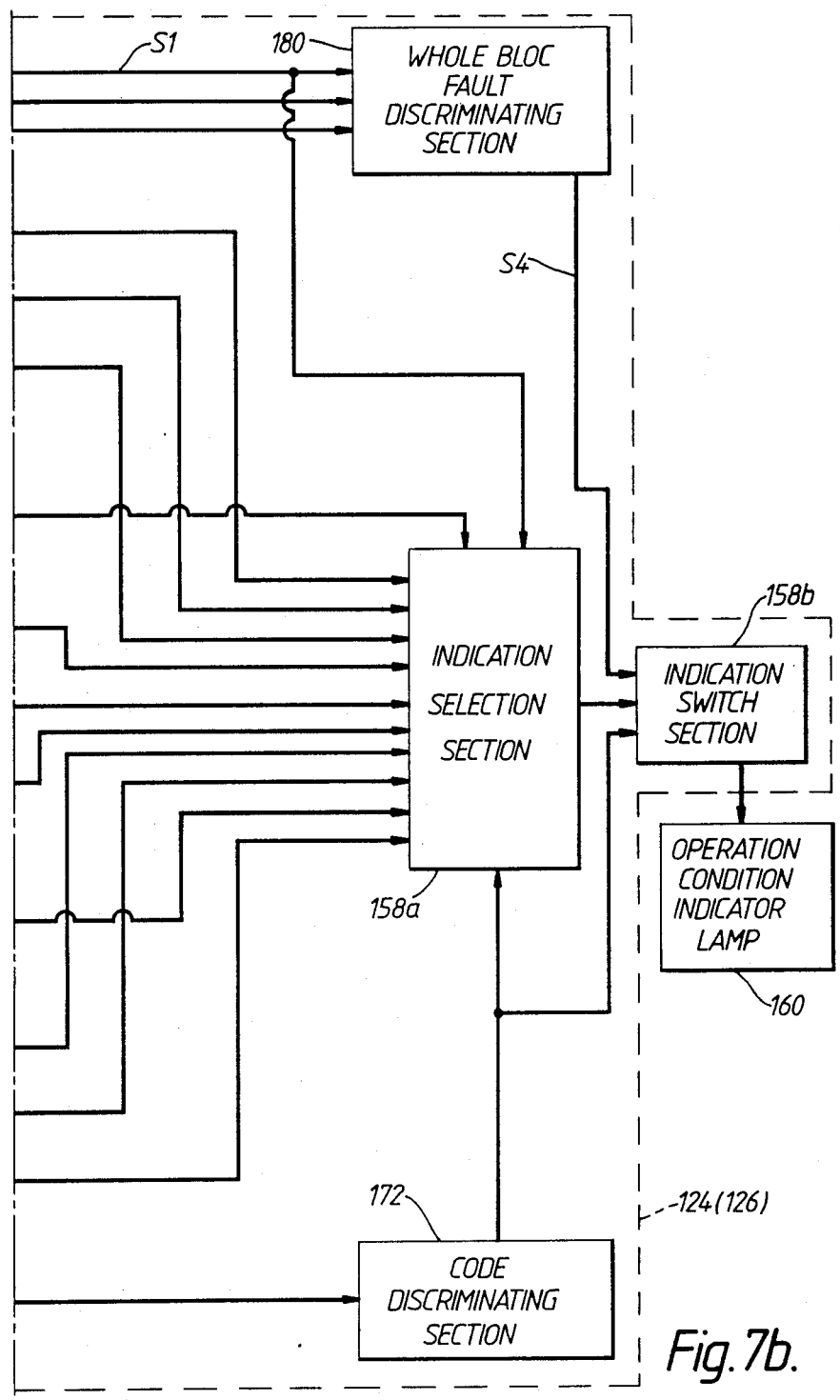

Referring now to FIG. 7, a third embodiment of the fault diagnostic apparatus for the air conditioning system will be described. The third embodiment of the fault diagnostic apparatus also comprises the indoor unit control circuit 124 and the wireless remote controller 144, in similar to the second embodiment. However, detected fault conditions are indicated by only one indicator lamp. The wireless remote controller 144 also has a construction the same or similar to the controller in the first embodiment. Therefore, the identification code signal is transmitted from the code signal transmission circuit 148 when the transmission start button 150 is operated by the serviceman.

The indoor unit control circuit 124 has a construction similar to the indoor unit control circuit 124 of the second embodiment. That is, the indoor unit control circuit 124 includes the code signal receiving circuit 152, the code discriminating section 172, the indoor unit bloc fault discriminating section 174, the outdoor unit bloc fault discriminating section 176, the cable bloc fault discriminating section 178, the whole bloc fault discriminating section 180, the indicator lamp control circuit 158a and the indicator lamp control circuit 158b. The indoor unit bloc fault discriminating section 174 receives detection signals outputted from the indoor unit fan fault detector 128, the atmospheric temperature sensor 130, the humidity sensor 132, etc. in the indoor unit 102 and outputs a first unit bloc fault discrimination signal S1, when any one of the indoor unit fan fault detector 128, the atmospheric temperature sensor 130, the humidity sensor 132 etc. detects a fault condition. The outdoor unit bloc fault discriminating section 176 receives detection signals outputted from the outdoor unit fan fault detector 138, the current sensor 142 and the refrigerant temperature sensor 140 in the outdoor unit 100 and outputs a second unit bloc fault discrimination signal S2, when any one of the outdoor unit fan fault detector 138, the current sensor 142 and the refrigerant temperature sensor 140 detects a fault condition. The detection signals of the outdoor unit fan fault detector 138, the current sensor 142 and the refrigerant temperature sensor 140 in the outdoor unit 100 are transmitted from the outdoor unit 100 to the indoor unit 102 through a cable 108 (see FIG. 1). The cable bloc fault discriminating section 178 receives detection signals outputted from the cable miscoupling condition detectors 182, 184 and 186 and outputs a third unit bloc fault discrimination signal S3, when any one of the cable miscoupling condition detectors 182, 184 and 186 detects a fault condition. The cable miscoupling condition detectors 182, 184 and 186 also can be formed by software systems in the indoor unit control circuit 124 that performs a function to detect a miscoupling of the 14 to the outdoor unit 100 or the indoor unit 102, in similar to the second embodiment.

The indoor unit bloc fault discriminating section 174, the outdoor unit bloc fault discriminating section 176 and the cable bloc fault discriminating section 178 supply the unit bloc fault discrimination signals S1, S2 and S3 to the indicator lamp control circuit 158a, respectively. The unit bloc fault discrimination signals are further applied to the whole bloc fault discriminating section 180. The whole bloc fault discriminating section 180 outputs a whole bloc fault discrimination signal S4 to the indicator lamp control circuit 158b, when any one of the indoor unit bloc fault discriminating section 174, the outdoor unit bloc fault discriminating section 176 and the cable bloc fault discriminating section 178 outputs the unit bloc fault discrimination signal S1, S2 or S3. The indicator lamp control circuit 158b further receives output signals of the indicator lamp control circuit 158a and the code discriminating section 172. An output signal of the indicator lamp control circuit 158b is applied to an indicator lamp 160, e.g., the operating state indicator lamp, as described in the first embodiment.

Referring now to FIG. 8, an operation flow chart is shown for the fault diagnostic routine of the indoor unit control circuit 124 of the third embodiment according to the present invention.

The routine starts when the serviceman operates the fault diagnostic mode switch of the wireless remote controller 144. The code generator 146 then reads out any one of the identification codes stored in the memories, in STEP 1. The identification code is easily able to be replaced by a desired one by operating a suitable key, e.g., an UP key or a DOWN key of the input keys. Bloc identification codes, e.g., codes "10", "20" and "30" are allotted to the indoor unit bloc fault discriminating section 174, the outdoor unit bloc fault discriminating section 176 and the cable bloc fault discriminating section 178, respectively. While a first group of individual identification codes "11", "12", "13" etc. are allotted to the indoor unit fan fault detector 128, the atmospheric temperature sensor 130, the humidity sensor 132 etc., respectively. A second group of individual identification codes "21", "22", "23" etc. are allotted to the outdoor unit fan fault detector 138, the refrigerant temperature sensor 140, the current sensor 142 etc., respectively. And a third group of individual identification codes "31", "32", "33" etc. are allotted to the cable miscoupling detectors 182, 184, 186 etc., respectively.

A prescribed bloc code signal corresponding to the desired identification code for one of the bloc fault discriminating sections is transmitted to the indoor unit control circuit 124 of the indoor unit 102. The routine forwards to a suitable flow branch in response to the bloc identification code, in STEP 2. In STEP 2, the serviceman can inspect whether any fault condition presents in a predetermined unit, i.e., the indoor unit 102, the outdoor unit 100 or the coupling state of the cable 108, according to the bloc identification code "10", "20" or "30". If the operation state indicator lamp 160 flickers (STEP 3a) as described later, the serviceman can forward to the inspection for the individual detector or sensors in the unit corresponding to the bloc identification code. If the operation state indicator lamp 160 fails to flicker (STEP 3b), the serviceman can return to the other inspection for the other unit in STEP 2. In the operations in STEP 2, the indoor unit control circuit 124 inspects automatically whether a prescribed bloc fault discriminating section, e.g., the indoor unit bloc fault discriminating section 174 produces the unit bloc fault discrimination signal S1 in response to the corresponding bloc identification code "10". When the prescribed bloc fault discriminating section, e.g., the indoor unit bloc fault discriminating section 174 is generating the unit bloc fault discrimination signal S1 at the time that the corresponding bloc identification code "10" is applied to the indoor unit control circuit 124, the indicator lamp control circuit 158b receives the unit bloc fault discrimination signal S1 through the indicator lamp control circuit 158a and drives the operation state indicator lamp 160 to flicker (STEP 3a). Thus, the serviceman can notice that there occures some fault in the prescribed unit, e.g., the indoor unit 102. Then the serviceman forwards to the inspection for the individual detector or the sensors in the prescribed unit (STEP 4).

The routines in STEP 4 and thereafter are performed in similar to the routines of the first embodiment (see STEP 2 in FIG. 3) or the second embodiment (see STEP 3 in FIG. 6). That is, the serviceman can discriminate the detector or the sensor in which the fault condition presents, in response to the individual identification code. A prescribed code signal corresponding to the desired individual identification code is transmitted to the indoor unit control circuit 124 of the indoor unit 102. The routine forwards to a suitable flow branch in response to the individual identification code (STEP 5). In the operations in STEP 5, the indoor unit control circuit 124 inspects automatically whether a prescribed detector or sensor, e.g., the indoor unit fan fault detector 128 produces the detection signal in response to the corresponding individual identification code "11". When the prescribed detector, e.g., the indoor unit fan fault detector 128 is generating the detection signal at the time that the corresponding individual identification code "11" is applied to the indoor unit control circuit 124, the indicator lamp control circuit 158b receives the detection signal through the indicator lamp control circuit 158a and drives the operation state indicator lamp 160 to flicker (STEP 6a). Thus, the serviceman can notice that there occures some fault in the prescribed element, e.g., the indoor unit fan 120 (see FIG. 1) corresponding to the indoor unit fan fault detector 128. If the operation state indicator lamp 160 fails to flicker (STEP 6b), the serviceman can return to the inspection of STEP 5 for the other detector or sensor in the same unit.

What is claimed is:

1. A fault detection diagnostic apparatus for a device subject to a plurality of predetermined fault conditions comprising:

means for detecting a fault occurrence for each of said plurality of predetermined fault conditions;

means for manually inputting one of a plurality of designated codes that corresponds to one of a plurality of corresponding groups, each corresponding group having at least two of said plurality of predetermined fault conditions;

control means that inputs said one designated code for determining if said fault occurrence exists for said at least two predetermined fault conditions in said corresponding group; and means responsive to said control means for indicating the existence of said fault occurrence in said corresponding group of said at least two predetermined fault conditions.

2. A fault detector according to claim 1 wherein said indicating means includes a lamp and said control means includes means for activating said lamp.

3. A fault detector according to claim 1 wherein said inputting means is a remote control unit that transmits said one designated code to said control means.

4. A fault detector according to claim 1 wherein said indicating means includes a mode indicator for indicating an operation mode of said device.

5. A fault detector according to claim 1 wherein said indicating means includes a group indicator for indicating if said fault occurrence exists for any of said at least two predetermined fault conditions in one of said corresponding groups.

6. A fault detector according to claim 5 wherein said means for manually inputting includes means for manually inputting one of a second plurality of designated codes that corresponds to one of said predetermined fault conditions;

said control means inputs said one of said second plurality of designated codes and determines if said fault occurrence exists for said predetermined fault condition corresponding to said one of said second plurality of designated codes; and said indicating means indicates the existence of said fault occurrence that corresponds to said one of said second plurality of designated codes.

7. A fault detector according to claim 1 wherein said indicating means indicates if said fault occurrence exists for each of said at least two predetermined fault conditions in one of said corresponding groups.

8. A fault detector according to claim 3 wherein said remote control unit includes a memory.

9. A fault detector according to claim 8 wherein said remote control unit contains an LED display for indicating said designated code that was manually inputted.

10. A temperature control apparatus including a fault detection diagnostic apparatus having a plurality of predetermined fault conditions comprising:

means for regulating temperature in a predetermined area, said regulating means including a temperature control means;

means for detecting a fault occurrence for each of said plurality of predetermined fault conditions;

remote control means for transmitting a temperature signal to said regulating means, said remote control means including means for manually inputting one of a plurality of designated codes that corresponds to one of a plurality of corresponding groups, each corresponding group having at least two of said plurality of predetermined fault conditions;

control means that inputs said one designated code for determining if said fault occurrence exists for said at least two predetermined fault conditions in said corresponding group; and means responsive to said control means for indicating the existence of said fault occurrence in said corresponding group of said at least two fault conditions.

11. A fault detection diagnostic apparatus for a device subject to a plurality of predetermined fault conditions comprising:

means for detecting a fault occurrence for each of said plurality of predetermined fault conditions;

means for manually inputting one of a plurality of designated codes that corresponds to one of said plurality of predetermined fault conditions;

means for determining if said fault occurrence exists for said predetermined fault condition corresponding to said one designated code;

means responsive to said determining means for indicating whether a fault occurrence exists for said predetermined fault condition corresponding to said designated code.

12. A fault detection diagnostic apparatus for a device subject to a plurality of predetermined fault conditions comprising:

means for detecting a fault occurrence for each of said plurality of predetermined fault conditions;

means for manually inputting one of a plurality of designated codes that corresponds to one of said plurality of predetermined fault conditions;

means that input said one designated code for determining if said fault occurrence exists for said predetermined fault condition corresponding to said one designated code; and means responsive to said determining means for indicating whether a fault occurrence exists for one of a plurality of predetermined groups containing said predetermined fault condition corresponding to said one designated code, each predetermined group composed of at least two of said predetermined fault conditions.

* * * * *